March 27, 1951 — S. V. HART — 2,546,926
ELECTRICAL REGULATION SYSTEM
Filed Dec. 30, 1948
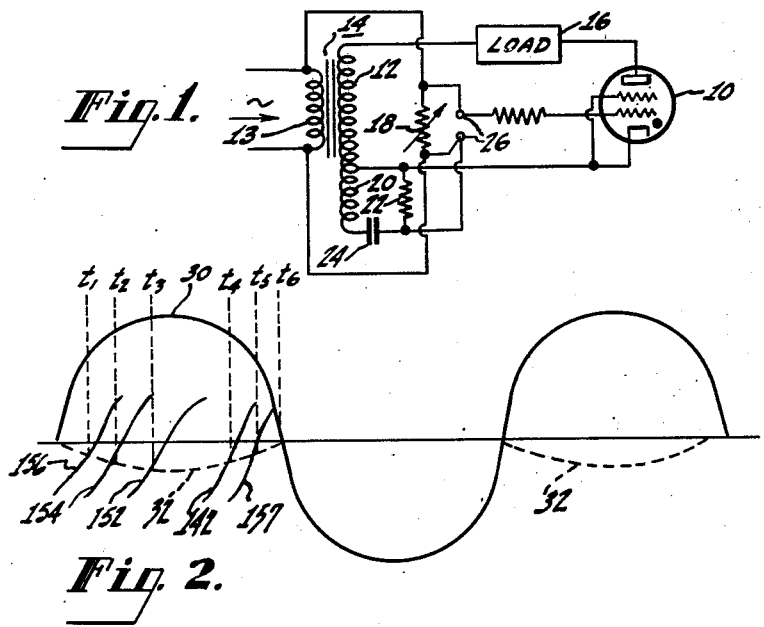
Fig. 1.
Fig. 2.
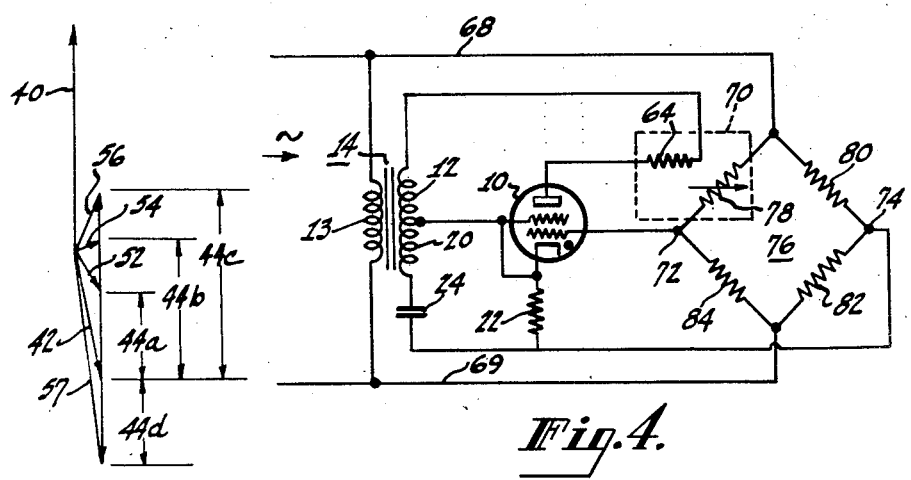
Fig. 3.
Fig. 4.
INVENTOR
STEPHEN V. HART
BY
ATTORNEY Patented Mar. 27, 1951

2,546,926

UNITED STATES PATENT OFFICE 2,546,926

ELECTRICAL REGULATION SYSTEM

Stephen V. Hart, Haddonfield, N. J., assignor to Radio Corporation of America, a corporation of Delaware Application December 30, 1948, Serial No. 68,277

2 Claims. (Cl. 323—4)

This invention relates to improvements in electrical regulation systems, and more particularly to an improved method of and apparatus for regulating current flow in gaseous discharge tubes, as, for example, in power control networks and the like.

It is well known that gaseous discharge tubes, operated with alternating anode voltage, are suitable for use in power control systems, in which a load device may be connected either directly or indirectly in the anode circuit of the tube, the usual arrangement being such that a variable voltage is applied to the control electrode of the tube to adjust the "firing point" for the tube (i. e. the point in each positive half-cycle of anode voltage at which the tube conducts current). Where an alternating anode voltage is used, it is theoretically possible to vary the total anode current between zero and an upper limit corresponding to conduction during all, or substantially all, of each positive half cycle of anode voltage. Both D. C. and A. C. control voltages have been used to adjust the firing point in systems of the foregoing type, but, as will be brought out more fully hereinafter, various difficulties and limitations have been encountered in the majority of the prior art systems.

It is one object of the invention to provide an improved method of and means for controlling the operation of a gaseous discharge tube.

Another object of the invention is to provide an improved method of and means for regulating current flow in a gaseous discharge tube.

Another object of the invention is to provide an improved network for regulating the transfer of power through a gaseous discharge tube to a load device.

According to the invention, the foregoing and other objects and advantages are attained by utilizing the vector sum of two alternating voltages to control the firing point of a gaseous discharge tube which is operating on alternating anode voltage. One of the control voltages is preferably of fixed magnitude and constant phase, leading or lagging the second control voltage by an appreciable angle, while the second control voltage is also of constant phase but of variable magnitude. As will be brought out more fully hereinafter, the foregoing arrangement not only provides for firing point adjustment throughout a range equal to the phase difference between the two control voltages, together with precision control of the firing point, but also permits the use of a variable control voltage which is in phase with, and may be taken from the same source as, the anode voltage. As will be shown, the latter feature is an extremely useful one for some applications.

A more complete understanding of the invention may be had by reference to the following description of illustrative embodiments thereof, when considered in connection with the accompanying drawing, in which:

Fig. 1 is a schematic diagram of a gaseous discharge tube control network arranged in accordance with the invention, Fig. 2 is a chart illustrating the operation of the networks shown in Figs. 1 and 4, Fig. 3 is a vector diagram of the voltages in the networks of Figs. 1 and 4, and Fig. 4 is a schematic diagram showing a network embodying the features of the invention as applied to a temperature control system.

Referring to the drawings, in Fig. 1 there is shown a control network comprising a gaseous discharge tube 10 adapted to be supplied with alternating anode voltage from one section 12 of the secondary winding of a transformer 14, through any suitable load device 16. A second section 20 of the secondary winding of the transformer 14, together with a phase shifting circuit, including a resistor 22 and a capacitor 24, serve as one source of control voltage for the tube 10, while a second control voltage may be applied through a pair of input terminals 26.

As is well known, if an alternating voltage is applied across a gaseous discharge tube, the tube can conduct current only during positive half cycles of anode voltage. Moreover, conduction in the tube can be prevented by holding the control electrode of the tube below a certain voltage, which will be referred to hereinafter as the critical control electrode voltage for the tube. This is illustrated in the graph of Fig. 2, wherein there are shown certain of the operating characteristics of the network of Fig. 1.

In Fig. 2, the curve 30 represents an alternating anode voltage for a gaseous discharge tube, while the broken-line curve 32 indicates the critical control electrode voltage for the tube. If the control electrode voltage goes above the level indicated by the curve 32, the tube will fire during the remainder of the corresponding positive half-cycle of anode voltage.

It has already been proposed to utilize a variable D. C. voltage as the control voltage for a gas tube so that the firing point of the tube can be varied. However, such an arrangement is objectionable for the reason that precise control of the firing point cannot be obtained therewith. This results from the fact that the critical control electrode voltage, shown by the curve 32 in Fig. 2, is not as precise or exact as the theoretical drawing would indicate. If the temperature of the tube cathode varies, or if spurious signals occur in the tube circuits, the exact point at which the tube will fire becomes uncertain. Accordingly, it has been proposed to utilize an alternating control voltage which will cross the critical voltage curve 32 at a steep angle, in order to ensure that the tube will fire exactly at the desired point. However, the use of a single alternating control voltage does not completely solve the difficulties outlined above. If a single alternating voltage of fixed phase and variable magnitude is used to adjust the firing point, either the available firing point range is extremely limited, or the same uncertainty encountered with a D. C. control voltage will arise. For this reason, it has generally been felt that a control voltage of variable phase is preferable, since a variable-phase control voltage can be shifted across the entire range of positive half cycles of anode voltage, while always crossing the critical voltage curve 32 at a steep angle. On the other hand, it is not always convenient to provide a single, variable-phase control voltage for the system.

The network shown in Fig. 1 largely avoids all of the foregoing difficulties by utilizing the vector sum of two control voltages to regulate the firing point of the tube 10. The first control voltage is obtained from the phase shifting network 22, 24, and is of fixed magnitude and constant phase, leading or lagging the second control voltage by a substantial angle, preferably slightly less than 180 degrees. As is well known, the phase shifting network 22, 24 can be adjusted, by varying the impedance of the resistor 22 with respect to the impedance of the capacitor 24, so that the voltage from the phase shifting network 22, 24 will lead or lag the voltage across the first section 12 of the secondary winding of the transformer 14 by an angle between zero and slightly less than 180°.

The second control voltage for the network of Fig. 1 may be obtained from the same source as the anode voltage, or may be obtained from a separate source. For example, the second control voltage may be taken across an impedance 18 connected in parallel with the primary winding 13 of the transformer 14. As was mentioned, the second control voltage should either lead or lag the first control voltage by an appreciable amount. By way of illustration, let it be assumed that the impedance of the resistor 22 is much larger than that of the capacitor 24, so that the voltage from the phase shifting network 22, 24 in Fig. 1 will lag the anode voltage by approximately 170 degrees. The second control voltage, across the terminals 26, is assumed to be in phase with the anode voltage. Under these conditions, the resultant control voltage at the grid of the tube 10 can be shifted in phase by varying the magnitude of the second control voltage, as is shown vectorially in Fig. 3.

In Fig. 3, the vector 40 represents the anode voltage for the tube 10 in Fig. 1. The vector 42 represents the fixed-phase control voltage from the phasing circuit 22, 24 of Fig. 1 and the vectors 44a, 44b, and 44c represent second control voltages, of different magnitudes, across the terminals 26. The vectors 52, 54, and 56 represent the resultant control voltage at the grid of the tube 10 in Fig. 1 for the combination of the vector 42 and the vectors 44a, 44b and 44c, respectively. As is shown in Fig. 3, variations in the magnitude of the second control voltage result in an effective phase shift of the resultant control voltage, while neither of the separate control voltages need be shifted in phase.

The effect of the resultant control voltages 52, 54, and 56, on the tube 10 in the circuit of Fig. 1, is shown on the graph of Fig. 2 by the curves 152, 154 and 156. As each of the different resultant control voltages 52, 54, and 56 is applied to the grid of the tube 10 in Fig. 1, the tube will conduct current during the intervals of positive half-cycles of anode voltage from $t_1$ to $t_6$, $t_2$ to $t_6$, and $t_3$ to $t_6$, respectively. It will be noted that the control voltages 152, 154 and 156 cross the critical voltage curve 32 at slightly different angles, due to the varying magnitudes of the resultant control voltages. However, the circuit operation will not be effected by such variations in resultant control voltage magnitude, provided the component control voltages are sufficiently large to provide an appreciable resultant control voltage.

In Fig. 4, there is shown the schematic diagram of a temperature control network embodying the features of the invention. In the network of Fig. 4, a heating element 64 is connected in the anode circuit of a gaseous discharge tube 10, so that the amount of current flowing through the element 64 can be regulated by adjusting the firing point of the tube 10. The heating element 64 may be located in any heat unit 70, such as an electric oven or the like. The temperature of the heat unit 70 will be dependent upon the amount of current flow through the heating element 64, so that the temperature of the heat unit 70 can be regulated by adjusting the current flow through the tube 10.

As in the circuit of Fig. 1, the firing point of the tube 10 in Fig. 4 is determined by the vector sum of two control voltages, one of which is obtained from one section 20 of the secondary winding of the transformer 14 and a phase shifting circuit 22, 24. The second control voltage is developed between two of the terminals 72, 74 of a conventional bridge circuit 76, which is connected across the supply lines 68, 69. The bridge 76 comprises four impedance elements such as the resistors 78, 80, 82, 84 connected as two parallel impedance branches in the usual manner.

One of the elements 78 of the bridge 76 is a so-called thermistor (i. e., a resistor whose value varies with temperature), which is located within the housing or other enclosing structure of the heat unit 70. The element 78 is adapted to respond to variations in temperature in the heat unit 70 and to increase or decrease in resistance in accordance with variations in temperature of the heat unit 70. The element 78 may have either a positive or negative temperature coefficient, depending on the particular way the circuit is arranged. As will be explained, the bridge 76 can be adjusted so that any variation in the temperature at the heat unit 70 will produce a change in the voltage between the terminals 72, 74 of the bridge 76, which will, in turn, produce a compensating change in the current flow through the tube 10.

Designating the magnitudes of the bridge elements 78, 80, 82, and 84 as $R_1$, $R_2$, $R_3$ and $R_4$, respectively, it is well known that the bridge 76 will be balanced, so that no voltage will appear between the terminals 72, 74, when $$R_1 = \frac{R_2 R_4}{R_3}$$

Also, when $R_1$ is less than $$\frac{R_2 R_4}{R_3}$$

a voltage will appear between the terminals 72, 74 which will be in phase with the voltage across the supply lines 68, 69, and when $R_1$ is greater than $$\frac{R_2 R_4}{R_3}$$

a voltage will appear between the terminals 72, 74 which will be 180 degrees out of phase with the voltage across the supply lines 68, 69. In either event, the magnitude of any voltage appearing between the two terminals 72, 74 will be dependent upon the magnitude $R_1$ of the element 78.

In the illustrative network of Fig. 4, the element 78 should have a positive temperature coefficient, so that the impedance of the element 78 decreases in magnitude when the temperature at the heat unit 70 decreases, and increases when the temperature at the heat unit 70 rises. The vector diagram of Fig. 3 and the operating chart of Fig. 2 will be referred to in explaining the operation of the network shown in Fig. 4.

It is assumed that the transformer 14 in Fig. 4 is so connected that the voltage across the first section 12 of the secondary winding is in phase with the voltage across the primary winding 13 and the supply lines 68, 69. In Fig. 3, the vector 40 may represent the voltage across the primary winding 13 and the first section 12 of the secondary winding of the transformer 14 in Fig. 4. It is also assumed that the phase shift circuit 22, 24 in Fig. 4 will introduce a phase lag of approximately 170° in voltages passing therethrough, so that the output voltage from the phase shift circuit 22, 24 may be represented by the vector 42 in Fig. 3.

When power is first applied to the network of Fig. 4 through the supply lines 68, 69, the element 78 will be "cold" and will, therefore, have a low impedance. The bridge 76 will be unbalanced in a direction to cause a large voltage, in phase with the supply voltage, to appear between the terminals 72, 74 of the bridge. The voltage between the terminals 72, 74 of the bridge 76 at this time may be represented by the vector 44c in Fig. 3. Accordingly, the firing point for the tube 10 in the circuit of Fig. 4 will occur near the beginning of each positive half cycle of anode voltage (at the time $t_1$, as shown by the curve 156 in Fig. 2), so that a large average current will flow through the tube 10 and, hence, through the heating element 64. As the temperature in the heat unit 70 rises, the impedance of the element 78 in the bridge 76 will gradually increase, causing a decrease in the voltage between the terminals 72, 74 of the bridge 76. As the voltage across the terminals 72, 74 decreases, the vector-resultant voltage at the grid of the tube 10 will lag the plate voltage by an increasing amount, shifting the firing point for the tube 10 (to the right in Fig. 2) and causing the tube 10 to conduct current during a decreasing portion of each positive half cycle of anode voltage, until conditions become balanced in the network at some predetermined temperature. Thereafter, any change in the temperature in the heat unit 70 will produce a compensating change in the voltage between the bridge terminals 72, 74, with a corresponding phase shift in the resultant voltage at the grid of the tube 10 in Fig. 4. The exact heat unit temperature at which the network of Fig. 4 will become stabilized will depend on the temperature response characteristics of the element 78. In the event that the temperature at the heat unit 70 becomes so high that the impedance $R_1$ of the element 78 is more than $$\frac{R_2 R_4}{R_3}$$

as previously designated, then the voltage between the terminals 72, 74 of the bridge 76 will be out of phase with the anode voltage on the tube 10. This out-of-phase voltage from the bridge 76 may be represented by the vector 44d in Fig. 3, and the resultant-vector control voltage at the grid of the tube 10 in Fig. 4 may be represented by the vector 57 in Fig. 3. In this case, the firing point for the tube 10 in Fig. 4 will be shifted still further to the right (to the point $t_5$, for example) on the chart of Fig. 2, wherein the resultant voltage corresponding to the vector 57 is represented by the curve 157. This will result in a further decrease in the current through the tube 10, and, hence, a decrease in the current through the heating element 64 in Fig. 4. Thus, the network of Fig. 4 is adapted to provide precise, continuous control of the current through the tube 10 across substantially the entire available current range.

It should be noted that the network of Fig. 4 permits the use of fixed phase control voltages, one of which is in phase with, and can be conveniently derived from, the same source as the load voltage. Moreover, the use of a vector-resultant control voltage eliminates the necessity for awkward variable-phase-shift networks, such as would be required if a single control voltage were used.

Since modifications and changes could be made in the circuits shown and described, within the scope and spirit of the invention, the foregoing is to be construed as illustrative, and not in a limiting sense.

What is claimed is:

1. A network for regulating power transfer from a source of alternating electric power to a load device through a gaseous discharge tube of the type having an anode, a cathode, and a control grid, said network comprising, a transformer having (1) a primary winding adapted to be connected to said source, and (2) a two-section secondary winding, an anode-to-cathode circuit for said tube, said circuit including said load device and one section of said secondary winding, a variable impedance element connected in parallel with said primary winding, and a grid-to-cathode circuit for said tube, said grid-to-cathode circuit consisting of (1) the other section of said secondary winding, (2) phase-shifting means connected in parallel with said other secondary winding section, and (3) said variable impedance element.

2. A network for regulating power transfer from a source of alternating electric power to a heating element, said network comprising a gaseous-discharge tube having an anode, a cathode, and a control electrode, a transformer having (1) a primary winding connected to said source, and (2) a two-section secondary winding, a plate-to-cathode circuit for said tube, said circuit including (1) one section of said transformer secondary winding, and (2) said heating element, an impedance bridge comprising parallel impedance branches, each of said impedance branches consisting of series connected impedances, one of said impedances comprising a thermally responsive resistor in heat transfer relation with said heating element, a grid-to-cathode circuit for said tube, said grid-to-cathode circuit including (1) the other section of said transformer secondary winding, (2) phase-shifting means in parallel with said other winding section, and (3) said one impedance, and connections from the junctions between adjacent impedances in two of said branches and said primary winding.

STEPHEN V. HART.

REFERENCES CITED

The following references are of record in the file of this patent:

UNITED STATES PATENTS

| Number | Name | Date |
|---|---|---|
| 1,694,294 | Hall | Dec. 4, 1928 |
| 1,857,174 | Zucker | May 10, 1932 |
| 1,970,427 | Lewin | Aug. 14, 1934 |
| 2,030,100 | Dawson | Feb. 11, 1936 |
| 2,467,856 | Rich | Apr. 19, 1949 |